United States Patent
French

(10) Patent No.: US 9,353,493 B1
(45) Date of Patent: May 31, 2016

(54) SHOVEL WITH LIVING HINGE

(71) Applicant: Donald French, Greene, NY (US)

(72) Inventor: Donald French, Greene, NY (US)

(*) Notice: Subject to any disclaimer, the term of this patent is extended or adjusted under 35 U.S.C. 154(b) by 0 days.

(21) Appl. No.: 14/887,706

(22) Filed: Oct. 20, 2015

(51) Int. Cl.
*E01H 5/02* (2006.01)
*A01B 1/02* (2006.01)

(52) U.S. Cl.
CPC ... *E01H 5/02* (2013.01); *A01B 1/02* (2013.01)

(58) Field of Classification Search
CPC .......... A01B 1/02; A01B 1/222; A01B 1/225; E01H 5/02
USPC .............. 294/49, 50, 53.5, 54.5, 59, 181
See application file for complete search history.

(56) References Cited

U.S. PATENT DOCUMENTS

| | | | | |
|---|---|---|---|---|
| 656,093 A * | 8/1900 | Caruthers | ............... | A01B 1/02 294/49 |
| 3,804,451 A * | 4/1974 | Burke | ............... | E01H 5/02 294/51 |
| 4,691,954 A * | 9/1987 | Shaud | ............... | B25G 1/04 16/422 |
| 4,783,105 A * | 11/1988 | Schulz | ............... | E01H 5/02 294/54.5 |
| 4,793,645 A * | 12/1988 | Decker | ............... | A01B 1/026 294/58 |
| 5,346,269 A * | 9/1994 | Price | ............... | A01B 1/02 294/49 |
| 5,419,600 A * | 5/1995 | Tisbo | ............... | E01H 5/02 294/54.5 |
| 5,533,768 A | 7/1996 | Mitchell | | |
| 5,816,632 A * | 10/1998 | Baldacci | ............... | E01H 5/12 294/51 |
| 6,203,081 B1 | 3/2001 | Kegan, Sr. | | |
| 6,663,085 B1 | 12/2003 | Dalon | | |
| 6,704,968 B2 | 3/2004 | Lau | | |
| 6,922,920 B1 | 8/2005 | Stratz | | |
| 7,559,591 B1 | 7/2009 | DeSanti | | |
| 9,039,054 B1 * | 5/2015 | French | ............... | A01B 1/026 294/54.5 |
| 2006/0197349 A1 * | 9/2006 | Dawes | ............... | E01H 5/02 294/54.5 |

* cited by examiner

*Primary Examiner* — Dean Kramer
(74) *Attorney, Agent, or Firm* — Kyle A. Fletcher, Esq.

(57) ABSTRACT

The shovel with living hinge is an improved manual snow shovel with a feature that adds efficiency when removing loose material from the surface of sidewalks, driveways, or pavements. The shovel with living hinge is made up of both conventional and unconventional parts that in whole provide benefits unlike other manual shovels. Located within the ribs of the shovel is a living hinge that aids in reducing the manual effort put forth by the user when pitching loose material away from a surface.

17 Claims, 6 Drawing Sheets

SHOVEL WITH LIVING HINGE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of general hand tools, more specifically, a manual loose material shovel with a living hinge as part of the ribbed portion of the shovel that adds efficiency in the heaving process when lifting and pitching loose material away from the surface of sidewalks, driveways, or pavements.

SUMMARY OF INVENTION

The shovel with living hinge is an improved manual snow shovel with a feature that adds efficiency when removing loose material from the surface of sidewalks, driveways, or pavements. The shovel with living hinge is made up of both conventional and unconventional parts that in whole provide benefits unlike other manual shovels. Located within the ribs of the shovel is a living hinge that aids in reducing the manual effort put forth by the user when pitching loose material away from a surface. In doing so, the user operates the shovel with living hinge by holding a conventional handle and cylindrical pole that is attached to both the shovel end and handle. While using the shovel with living hinge in hand, he or she places the shovel's edge on the surface where loose material exists and pushes the shovel edge into the material so that the shovel's edge, forward to the living hinge, is loaded with loose material. The user then lifts the shovel by hand as the weight of the light snow and upward shoveling motion causes downward tension to be placed upon the living hinge; thus creating a sense that the edge of the shovel is spring loaded. As the user ceases his or her movement of the loaded shovel towards the desired direction that he or she wishes to place the loose material, the tension that was created upon the living hinge causes the shovels edge to return to its original position; therefore, thrusting the loose material off of the shovel's edge without additional force to be applied by the user.

An advantage of the shovel with living hinge consist of, but is not limited to, an increased efficiency in the process of manually removing loose material from the surface of sidewalks, driveways, or pavements, which in turn results in both conserving and reducing the energy that is typically applied by the user when performing tasks alike. As an added benefit to these results, the user may be able to perform loose material removal tasks in less time, and/or have more energy and stamina to operate the shovel longer.

It is an object of the invention to provide a living hinge as part of a manual shovel.

It is a further object of the invention to provide a snow shovel with a living hinge that reduces the user's input when he or she is moving loose material away from the surface of sidewalks, driveways, or pavements.

It is a further object of the invention to create a shovel with a living hinge that aids with springing loose material off of the shovel's edge through tension(s) created by the weight of the material in combination with the user's shoveling movement(s).

This together with additional objects, features, and advantages of the shovel with living hinge will be readily apparent to those of ordinary skill in the art upon reading the following detailed description of the presently preferred, but nonetheless illustrative, embodiments when taken in conjunction with the accompanying drawings.

In this respect, before explaining the current embodiments of the shovel with living hinge in detail, it is to be understood that the shovel with living hinge is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shovel living hinge.

It is therefore important that the claims be regarded as including such equivalent construction insofar as they do not depart from the spirit and scope of the shovel with living hinge. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Furthermore, there is no intention to be bound by any expressed or implied theory presented in the preceding technical field, background, brief summary or the following detailed description.

Figure 1:
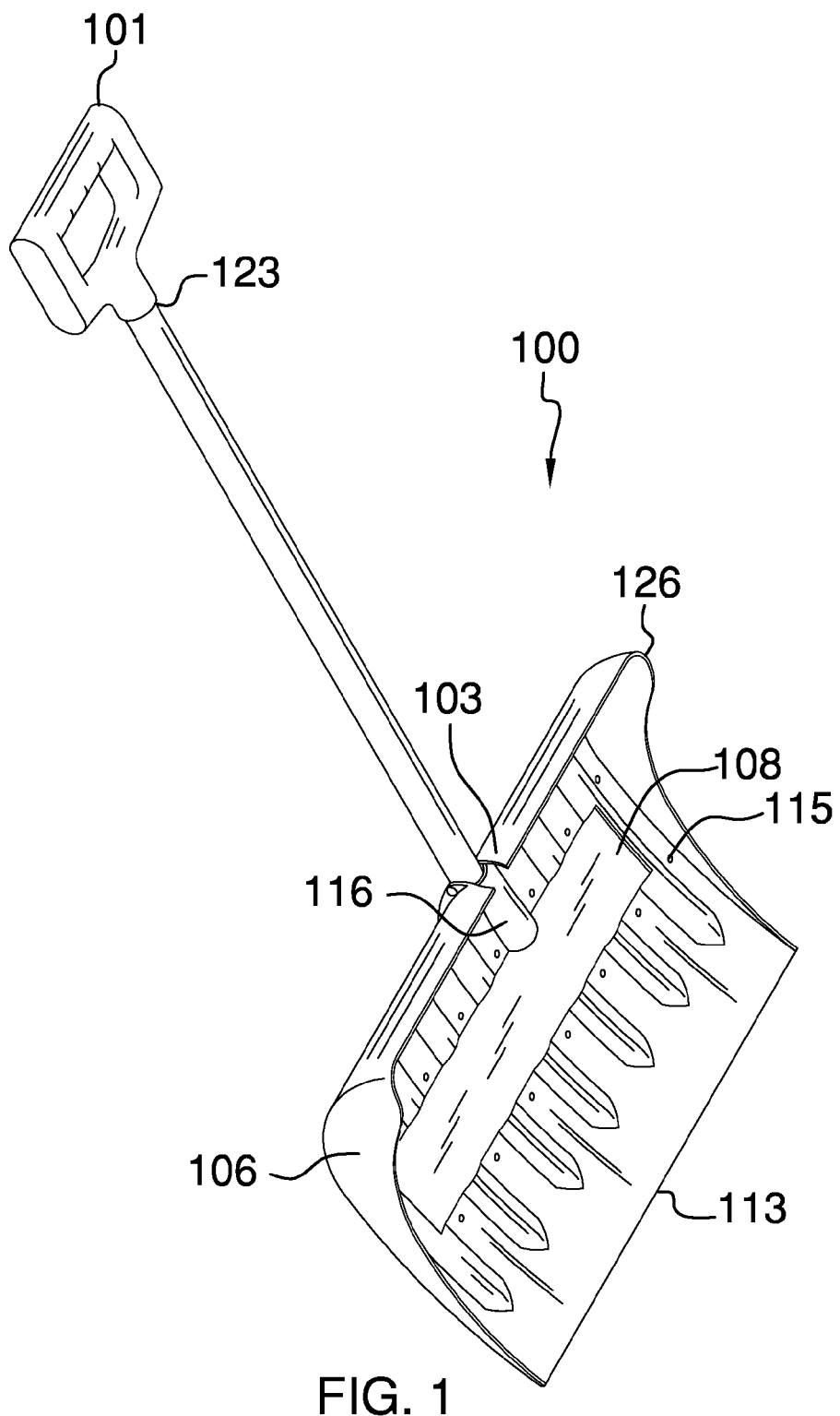
FIG. 1 is a perspective view of an embodiment of the disclosure.
Figure 2:
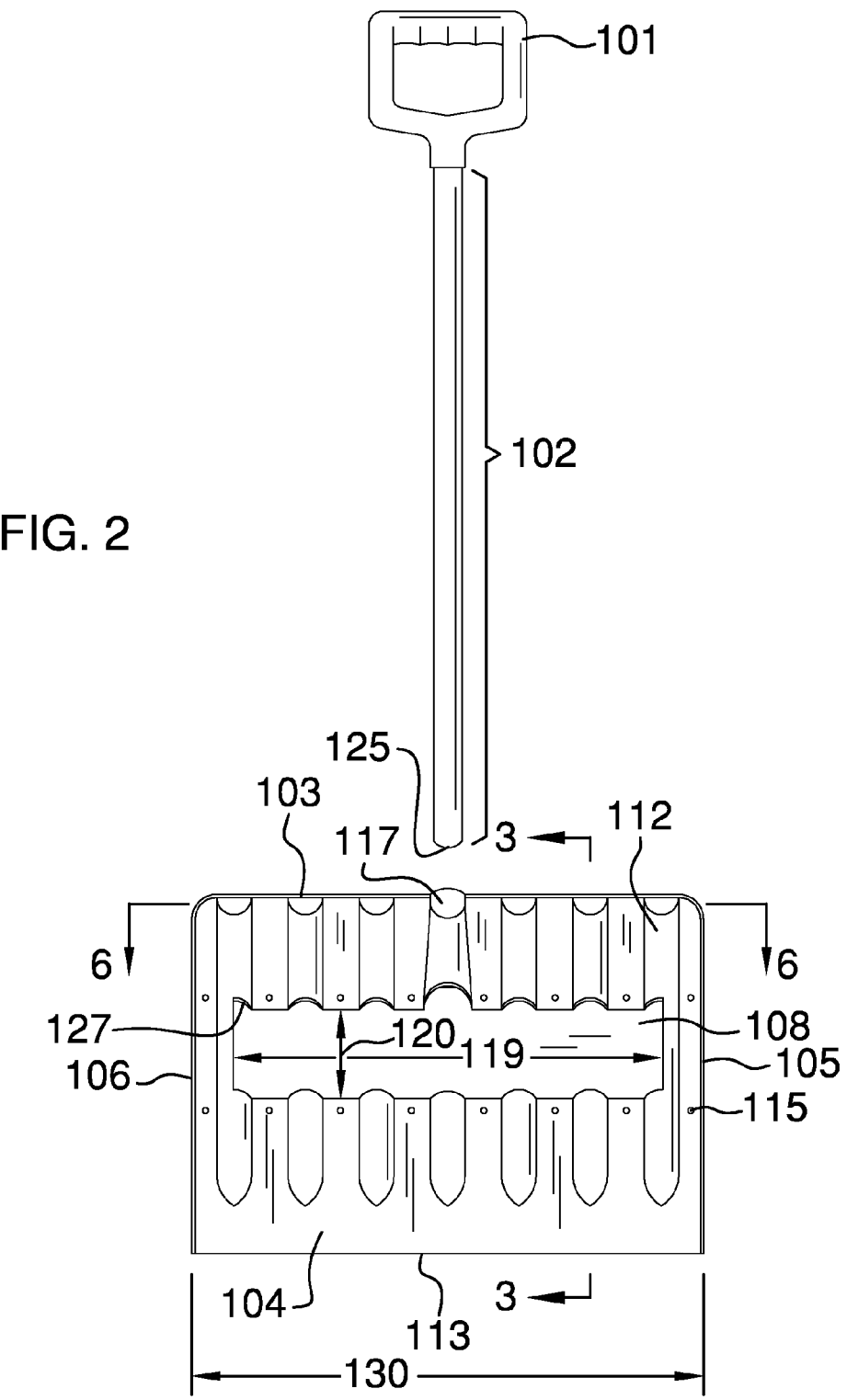
FIG. 2 is a front view of an embodiment of the disclosure.
Figure 3:
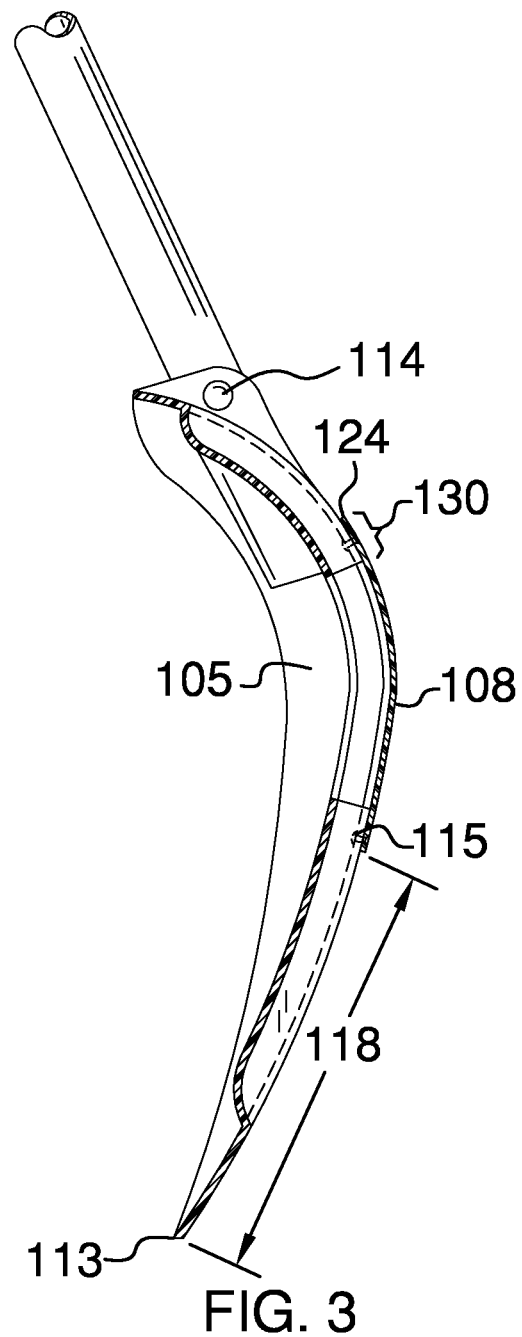
FIG. 3 is a cross-sectional view of an embodiment of the disclosure along line 3-3 in FIG. 2.
Figure 4:
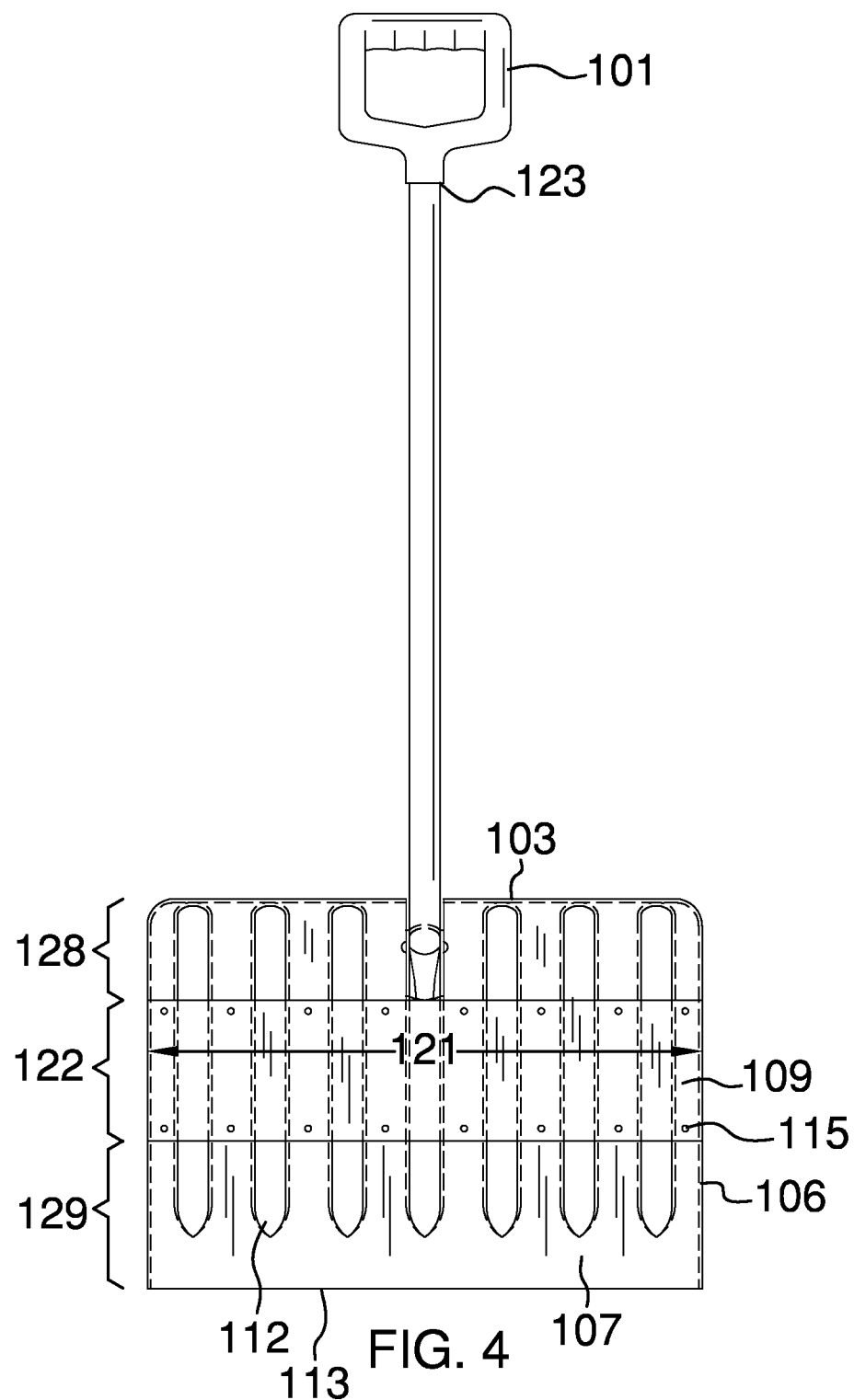
FIG. 4 is a back view of an embodiment of the disclosure.
Figure 5:
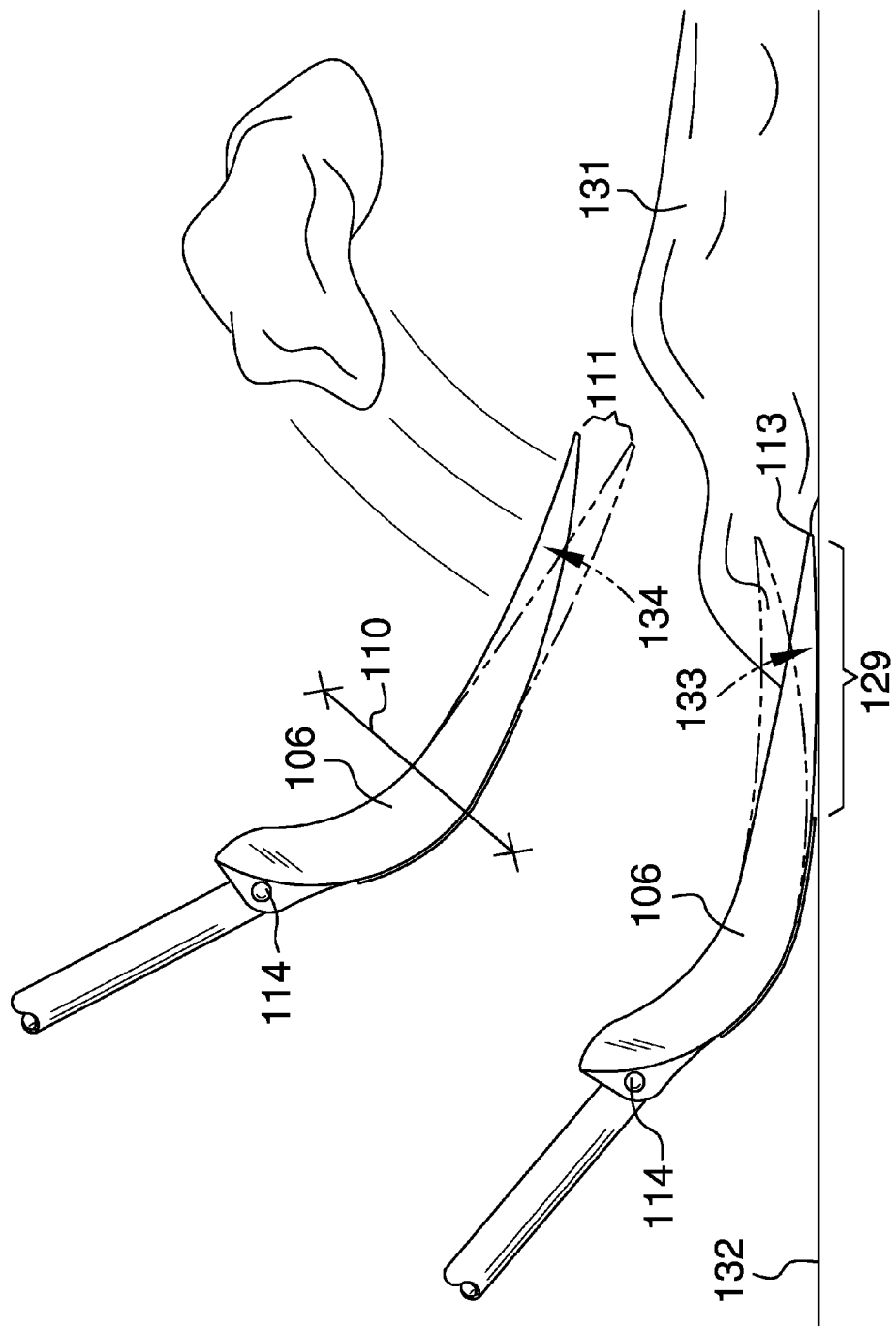
FIG. 5 is a side perspective view of an embodiment of the disclosure in use.
Figure 6:
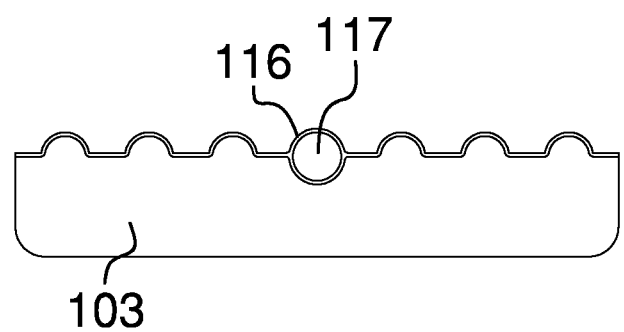
FIG. 6 is a cross-sectional view of an embodiment of the disclosure along line 6-6 in FIG. 2.

Detailed reference will now be made to a first potential embodiment of the disclosure, which is illustrated in FIGS. 1 through 6, in the form of the shovel with living hinge 100 (hereinafter invention), and that assembled tool is preferably a snow shovel. It is also noted, however, that this tool may not be limited to the uses of a typical shovel, and may be applicable to other hand tools, as, e.g. other shovels, spades, hoes, etc.

The invention 100 comprises of a handle 101 that is attached at a point 123 to a cylindrical portion 102. The cylindrical portion 102 has an end 125 that fits within a socket 117 that is located at the top surface 103 of the shovel. The cylindrical portion 102 is fixed within the socket 117 with at least one fastener 114. The at least one fastener 114 comprises the use of a rivet, bolt, or screw.

A shovel assembly 126 comprises a top surface 103, a bottom edge 113, a first arcuate side surface 105 that is symmetrical to a second arcuate side surface 106, a front surface 104, and a rear surface 107. The first and second arcuate side surfaces 105 & 106 are symmetrical, and both decrease in a radial extent from the top surface 103 to the bottom edge 113 along with both the front surface 104 and rear surface 107 of the shovel assembly 126. It shall be noted that the term shovel assembly 126 may be interchanged more simply with the shovel 126. The front surface 104 and rear surface 107 have reinforced ribs 112. The front surface 104 has a rectangular opening 127, which has a rectangular width of 119 and a rectangular height of 120.

The rectangular opening 127 exposes the top surface 108 of the living hinge 124 where it meets the rear surface 107 of the shovel and is fixed to the shovel with at least one rivet, bolt, or screw 115. The living hinge 124 overlaps 130 the bottom surface 107, has an arcuate radius that follows the shape of the bottom surface 107 of the shovel, a living width of 121, which is no less than the width of the shovels edge 130. The living hinge is positioned at a first distance 129 from the bottom edge, and a second distance 128 from the top of the shovel, and has a living height 122.

When the invention 100 is in use, the user places the shovel's bottom edge 113 on to the ground 132 and uses either or both the handle 101 and/or the cylindrical portion 102 to drive the shovel's bottom edge 113 beneath loose material 131 at a distance equal to, or less than distance 129; between the bottom edge 113 and the living hinge 124 on the front surface 107. The user then lifts the shovel with loose material 131 that creates a downward tension 133 to be applied to the living hinge 124 along hinge line 110. The user then moves the shovel in an upward motion towards where they desire the loose material 131 to be pitched, and as the upward motion ceases, the stored tension in the living hinge 124 to causes the bottom edge 113 and front surface 107 of the shovel to spring upward along the hinge line 110 as the living hinge 124 utilizes stored tension causing the loose material 131 to be further pitched upward 134 from the bottom edge 113 and front surface 107 of the shovel. The distance 111 that the bottom edge 113 travels when the living hinge 124 is stressed and distress is no less than 0.0125 inches and no greater than 6 inches.

It shall be noted that the term of loose material 131 may be referred to loose material. Moreover, the term loose material may be used to refer to any type of material of any weight, size, density, etc. that being said, the invention 100 is not limited to use with any type of loose material 131.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shovel with a living hinge; wherein the shovel is adapted to be loaded with a loose material; wherein the shovel is adapted to be grasped via a handle; wherein the shovel is manipulated via the handle in order for the living hinge to flex, and which is adapted to fling said loose material;

wherein the shovel is further defined with a top surface, a bottom edge, a first arcuate side surface, a second arcuate side surface, a front surface, and a rear surface;

wherein the living hinge overlaps the rear surface, and is further defined with an arcuate radius that is consistent with the rear surface of the shovel; wherein the living hinge is further defined with a living width, which is no less than the width of the shovel.

2. The shovel as described in claim 1 wherein the handle is attached at a point to a cylindrical portion.

3. The shovel as described in claim 2 wherein the cylindrical portion has an end that fits within a socket that is located at the top surface of the shovel.

4. The shovel as described in claim 3 wherein the cylindrical portion is fixed within the socket with at least fastener; wherein the fastener comprises a rivet, bolt, or screw.

5. The shovel as described in claim 4 wherein the first arcuate side surface is symmetrical with respect to the second arcuate side surface.

6. The shovel as described in claim 5 wherein both the first arcuate side surface and the second arcuate side surface decrease in a radial extent from the top surface to the bottom edge along with both the front surface and rear surface of the shovel.

7. The shovel as described in claim 6 wherein the front surface and rear surface have a plurality of reinforced ribs.

8. The shovel as described in claim 7 wherein the front surface has a rectangular opening, which is further defined with a rectangular width as well as a rectangular height.

9. The shovel as described in claim 8 wherein the rectangular opening exposes the top surface of the living hinge where it meets the rear surface of the shovel.

10. The shovel as described in claim 9 wherein the living hinge is positioned at a first distance from the bottom edge; wherein the living hinge is positioned at a second distance from the top of the shovel, and is further defined with a living height.

11. The shovel as described in claim 10 wherein in use, the bottom edge of the shovel is adapted to be positioned on to the ground and the handle and/or the cylindrical portion is manually grasped in order to manually drive the bottom edge beneath said loose material at a distance from the bottom edge and the living hinge on the front surface; wherein the shovel is adapted to be lifted with said loose material, and a downward tension is applied via manually manipulating the handle with respect to the cylindrical portion in order for the living hinge to propel the bottom edge and front surface of the shovel to spring upward along a hinge line as the living hinge utilizes stored tension adaptively causing the loose material to be further pitched upward from the bottom edge and front surface of the shovel.

12. The shovel as described in claim 11 wherein the distance that the bottom edge travels when the living hinge is stressed and distress is no less than 0.0125 inches and no greater than 6 inches.

13. A shovel with a living hinge;
  wherein the shovel is adapted to be loaded with a loose material;
  wherein the shovel is adapted to be grasped via a handle;
  wherein the shovel is manipulated via the handle in order for the living hinge to flex, and which is adapted to fling said loose material;
  wherein the handle is attached at a point to a cylindrical portion;
  wherein the shovel is further defined with a top surface, a bottom edge, a first arcuate side surface, a second arcuate side surface, a front surface, and a rear surface;
  wherein the front surface and rear surface have a plurality of reinforced ribs; wherein the front surface has a rectangular opening, which is further defined with a rectangular width as well as a rectangular height; wherein the rectangular opening exposes the top surface of the living hinge where it meets the rear surface of the shovel; wherein the living hinge overlaps the rear surface, and is further defined with an arcuate radius that is consistent with the rear surface of the shovel; wherein the living hinge is further defined with a living width, which is no less than the width of the shovel.

14. The shovel as described in claim 13 wherein the cylindrical portion has an end that fits within a socket that is located at the top surface of the shovel; wherein the cylindrical portion is fixed within the socket with at least fastener; wherein the fastener comprises a rivet, bolt, or screw.

15. The shovel as described in claim 14 wherein the first arcuate side surface is symmetrical with respect to the second arcuate side surface; wherein both the first arcuate side surface and the second arcuate side surface decrease in a radial extent from the top surface to the bottom edge along with both the front surface and rear surface of the shovel.

16. The shovel as described in claim 15 wherein the living hinge is positioned at a first distance from the bottom edge; wherein the living hinge is positioned at a second distance from the top of the shovel, and is further defined with a living height; wherein in use, the bottom edge of the shovel is adapted to be positioned on to the ground and the handle and/or the cylindrical portion is manually grasped in order to manually drive the bottom edge beneath said loose material at a distance from the bottom edge and the living hinge on the front surface; wherein the shovel is adapted to be lifted with said loose material, and a downward tension is applied via manually manipulating the handle with respect to the cylindrical portion in order for the living hinge to propel the bottom edge and front surface of the shovel to spring upward along a hinge line as the living hinge utilizes stored tension adaptively causing the loose material to be further pitched upward from the bottom edge and front surface of the shovel.

17. The shovel as described in claim 16 wherein the distance that the bottom edge travels when the living hinge is stressed and distress is no less than 0.0125 inches and no greater than 6 inches.

\* \* \* \* \*